(12) United States Patent
Andersson

(10) Patent No.: US 7,393,010 B2
(45) Date of Patent: Jul. 1, 2008

(54) AIR-BAG ARRANGEMENT

(75) Inventor: Stefan Andersson, Alingsás (SE)

(73) Assignee: Autoliv Development AS, Vargarda (SE)

( * ) Notice: Subject to any disclaimer, the term of this patent is extended or adjusted under 35 U.S.C. 154(b) by 218 days.

(21) Appl. No.: 10/517,409

(22) PCT Filed: May 9, 2003

(86) PCT No.: PCT/SE03/00750

§ 371 (c)(1),
(2), (4) Date: Jun. 29, 2005

(87) PCT Pub. No.: WO03/104046

PCT Pub. Date: Dec. 18, 2003

(65) Prior Publication Data

US 2005/0253368 A1  Nov. 17, 2005

(30) Foreign Application Priority Data

Jun. 5, 2002  (GB) .................................. 0212921.1

(51) Int. Cl.
*B60R 21/30* (2006.01)
(52) U.S. Cl. ..................... 280/739; 280/742
(58) Field of Classification Search .................. 280/739, 280/740, 741, 742

See application file for complete search history.

(56) References Cited

U.S. PATENT DOCUMENTS

| 5,234,229 A | 8/1993 | Gordon |
| 5,695,214 A | 12/1997 | Faigle et al. |
| 6,082,765 A | 7/2000 | Bowers et al. |
| 6,213,502 B1 * | 4/2001 | Ryan et al. ................... 280/736 |
| 6,406,055 B1 * | 6/2002 | Faigle et al. ................. 280/736 |
| 6,439,603 B2 * | 8/2002 | Damman et al. ............. 280/736 |
| 6,588,795 B2 * | 7/2003 | Fischer et al. ............... 280/736 |
| 6,736,425 B2 * | 5/2004 | Lemon et al. ............... 280/736 |

FOREIGN PATENT DOCUMENTS

| DE | 199 52 967 C1 | 2/2001 |
| EP | 1356998 A1 | 10/2003 |

\* cited by examiner

*Primary Examiner*—Ruth Ilan
*Assistant Examiner*—Robert A. Coker
(74) *Attorney, Agent, or Firm*—Brinks Hofer Gilson & Lione

(57) ABSTRACT

An air-bag arrangement includes an air-bag and a gas generator to supply gas to inflate the air-bag. The gas generator is hingedly connected to a support and is hingedly movable between a closed position in which the gas generator extends across and closes an aperture, and a second position in which the apertured is opened to permit the flow of gas from the air-bag. The gas generator is initially retained in position by a retainer the retainer being actuable, in response to a signal, to enable the gas generator to move hingedly to the open position.

7 Claims, 5 Drawing Sheets

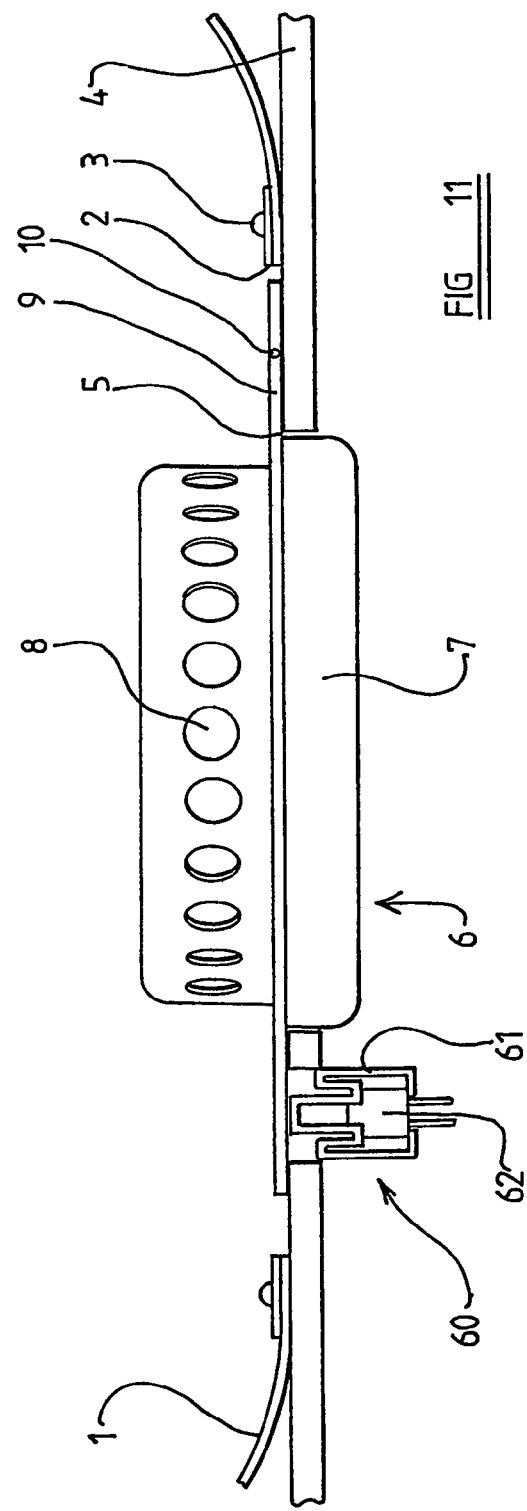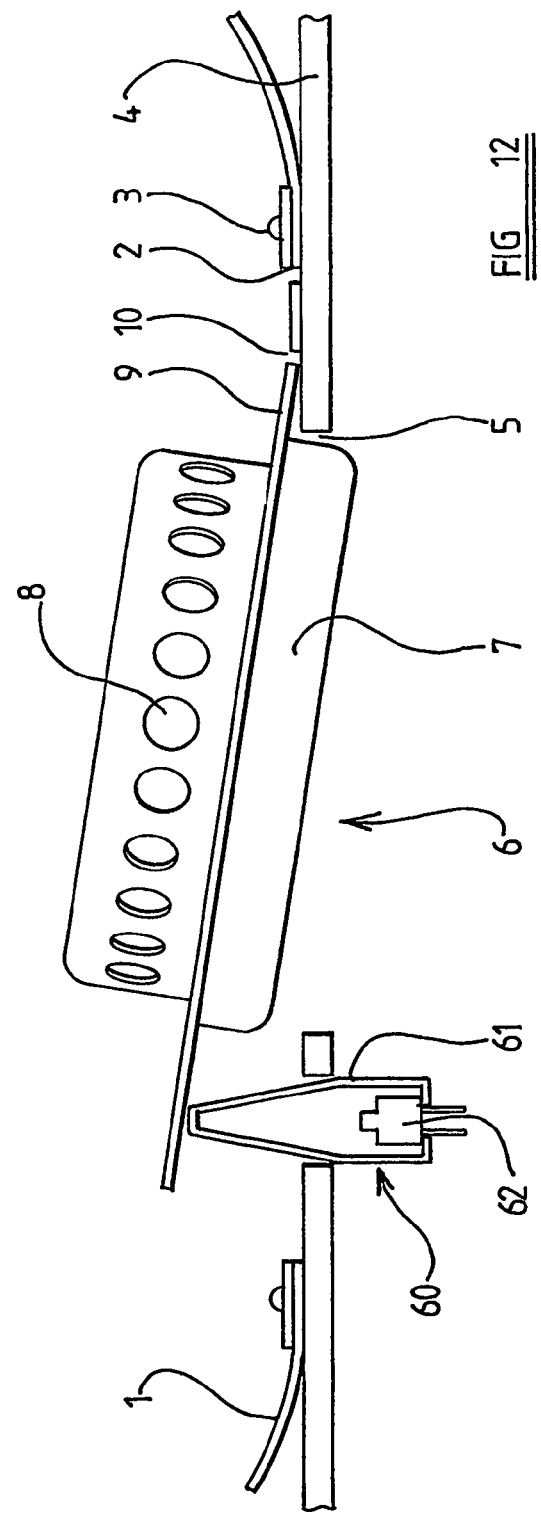

AIR-BAG ARRANGEMENT

CROSS REFERENCE TO RELATED APPLICATION

This application claims priority to PCT/SE03/00750, filed May 5, 2003, and GB0212921.1, filed Jun. 5, 2002.

BACKGROUND OF THE INVENTION

The present invention relates to an air-bag arrangement, and more particularly relates to an air-bag arrangement adapted to be controllably vented.

It is known that it is desirable to vent an air-bag provided for use in a motor vehicle to protect an occupant of the vehicle in the event that an accident should occur, especially if the air-bag is of the type intended to provide protection in the event that a front impact should occur.

An air-bag that is intended to provide protection in the case that a front impact should occur is generally located so that, when inflated, the air-bag is positioned in front of the occupant to be protected. During the front impact the vehicle decelerates suddenly. Due to inertia, the occupant of the vehicle tends to continue moving, and thus the occupant of the vehicle is, in effect, moving forwardly relative to the rest of the vehicle. The function of the air-bag is to decelerate the occupant, preferably in such a way that the occupant suffers no injury. The air-bag must be inflated very swiftly and thus, typically contains relatively high-pressure gas. If the air-bag were not vented, then because of the high gas pressure within it, the air-bag would not decelerate the occupant in a desired manner. Thus many air-bags are provided with vent holes formed in them so that, when the air-bag is struck by the occupant, gas can escape from the air-bag through the vent hole or holes, so that the air-bag serves the function of decelerating the occupant more gently, to avoid such injury.

In many cases it is desirable to be able to control the degree of venting, or the time at which venting commences. For example, if an occupant of a seat is out of the ordinary seating position and is, for example leaning forwardly, then it is desirable to commence venting of the air-bag at a very early stage during its inflation. Varying degrees of venting may be desirable depending upon the weight and/or size of the occupant to be protected by the air-bag.

Various mechanisms have been proposed previously for the controllable venting of an air-bag.

The present invention seeks to provide an improved air-bag arrangement.

SUMMARY OF THE INVENTION

Further to the present invention, there is provided an air-bag arrangement comprising an air-bag, and a gas generator to generate gas to inflate the air-bag, the gas generator being hingedly connected to a support so as to be moveable between a closed position in which part of the gas generator extends across an aperture communicating with the interior of the air bag to close the aperture, and a second position in which the aperture is opened to permit the flow of gas from the air-bag, the gas generator initially being retained in the closed position by a retainer, the retainer being actuable, in response to a signal, to enable the gas generator to move hingedly to the open position Preferably, the retainer is actuated by a pyrotechnic charge.

Advantageously, the retainer includes at least one catch which initially extends over part of a flange carried by the gas generator, the retainer also including an arrangement to move one or more of the catches to a position in which it does not extend over the flange of the gas generator.

Conveniently, one or more of the catches comprises an elongate element pivotally mounted at one end adjacent to part of the flange, part of one or more of the catches overlying the flange and being arranged so that actuation of a piston-and-cylinder arrangement will cause the catch to move to a position in which it no longer overlies the flange.

Preferably two catches are provided.

Advantageously, one or more of the catches are provided with a substantially centrally located pivot, a first part of the catch to one side of the pivot engaging with the flange, the other part of the catch being located adjacent a piston-and-cylinder device, such that movement of the piston will cause rotation of the catch to a position in which the first part of the catch no longer engages the flange.

Conveniently, the retainer comprises an exploding bolt.

Preferably, the retainer comprises a piston-and-cylinder unit arranged to engage and move part of a flange carried by the gas generator so as to move the gas generator to the open position.

Advantageously, the retainer comprises an expandable element which engages part of a flange carried by the gas generator, the expandable element on expansion thereof, serving to move the gas generator to the open position.

Conveniently, the expandable element is plastically deformable.

Preferably, the expandable element comprises a bellows arrangement provided with a pyrotechnic device.

In order that the invention may be more readily understood, and so that further features thereof may be appreciated, embodiments of the invention will be described, by way of example, with reference to the accompanying drawings in which:

BRIEF DESCRIPTION OF THE DRAWINGS

FIG. 11 is a view corresponding generally to FIG. 1, showing another embodiment of the invention, and FIG. 12 is a view corresponding generally to FIG. 11 showing a part of the embodiment of FIG. 11 is in an alternate condition.

DETAILED DESCRIPTION OF THE INVENTION

Figure 1:
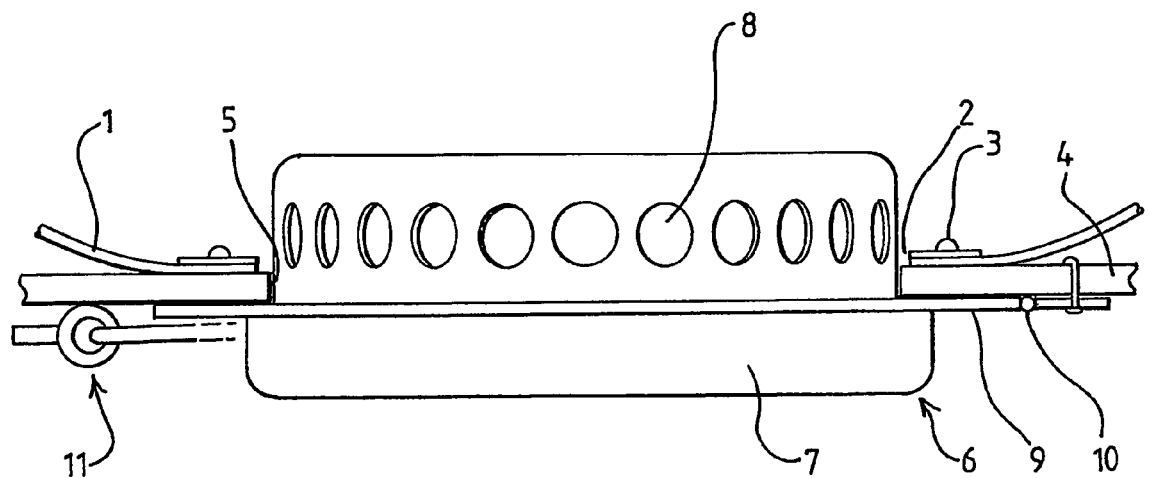
FIG. 1 is a partly sectional and partly elevational view of a part of an arrangement in accordance with the invention, illustrating the gas generator and part of the air-bag.
Figure 2:
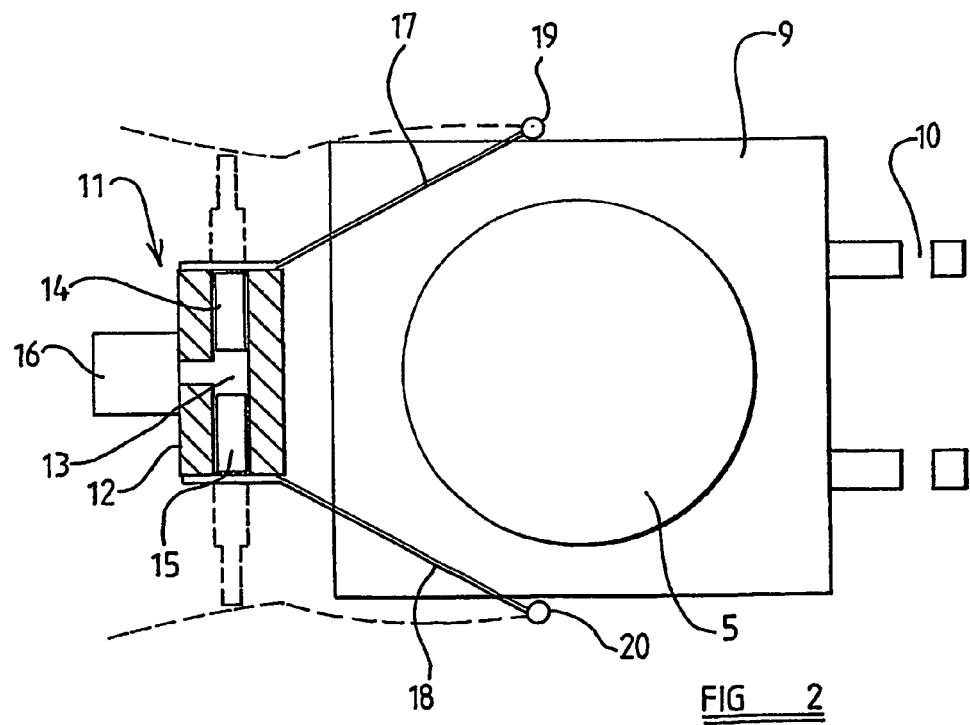
FIG. 2 is a plan view of the arrangement shown in FIG. 1, illustrating components in an initial position in solid line, and in a final position in phantom.

Referring initially to FIGS. 1 and 2 of the accompanying drawings, an air-bag arrangement in accordance with the present invention comprises an air-bag 1 which may be of any convenient design and which may, in particular, be an air-bag intended for use in protecting an occupant of the vehicle in the case that a frontal impact should arise. Thus the air-bag 1 may be a driver air-bag or passenger air-bag in a motor car.

The air-bag 1 defines an opening or aperture 2 communicating with the interior of the air-bag 1, and is, in the region of the opening or aperture 2, secured by securing element 3 to a support plate 4. The support plate 4 defines an aperture 5 which is aligned with the aperture 2 of the air-bag.

Mounted on the exterior of the support plate 4 is a gas generator 6. The gas generator 6 is provided with a generally cylindrical housing 7 which has a plurality of gas outlet apertures 8. The housing 7 of the gas generator 6 is dimensioned to pass through the aperture 5 in the support plate and through the aligned aperture 2 in the air-bag so that the gas outlet apertures 8 are located within the interior of the air-bag 1.

The gas generator 6 is provided with a radially outwardly extending flange 9. In this embodiment of the invention the flange 9 is shown as being of square form, but the flange 9 may have any appropriate configuration. As shown in FIG. 1, one side edge of the flange 9 is connected, by means of a hinge 10 to the underside of the support plate 4. The entire gas generator 6 is thus connected to the support plate 4 in a hinged manner, and can move hingedly, in the manner of a door, from a closed position in which the gas generator 6 extends across the apertures 5,2, to an open position in which the gas generator 6 effectively opens the aligned apertures 5, 2 in the support plate 4 and the air-bag 1 to permit the outflow of gas from the interior of the air-bag 1.

The gas generator 6 is provided with a retainer 11 (illustrated only schematically in FIG. 1) which retains the gas generator within its initial closed position, as shown in FIG. 1, in which it effectively closes the aligned apertures 5,2 in the support plate 4 and the air-bag 1.

As can be seen more clearly in FIG. 2, the retainer 11 comprises a housing 12 defining an axial bore 13, the bore containing two pistons 14, 15 which are initially slightly spaced-apart from one another within the bore 13. A secondary gas generator 16 is arranged to supply gas to the region of the bore 13 between the pistons 14, 15.

It is to be understood that when gas is supplied from the secondary gas generator 16 upon receipt of a firing signal, the pistons 14 and 15 are driven outwardly, in opposite directions along the bore 13. The pistons 14,15 may, as shown in FIG. 2, be "telescopic" pistons which, on actuation of the secondary gas generator 16, are caused to move to the respective positions illustrated in phantom, in which each piston extends a substantial distance from the housing 12.

Two pivotally mounted catch elements 17, 18 are provided, of elongate form. The first catch element 17 is mounted pivotally at one end 19 thereof to the support plate 4 at a position adjacent the flange 9, from where it extends across part of the flange 9 of the main gas generator 6, to a position located adjacent the part of the housing 12 containing the first piston 14. Similarly the second catch element 18 is mounted pivotally at one end 20 thereof to the support plate 4 adjacent the flange 9 and having the other end thereof located adjacent that part of the housing 12 which contains the second piston 15. Again the second catch element 18 extends across part of the flange 9 of the main gas generator 6. The effect of the catch elements 17, 18 is that the flange 9 is retained in position, and thus the main gas generator 6 cannot effect any hinging movement about the hinge 10, but instead is retained in its initial closed position illustrated in FIG. 1.

In response to an appropriate firing signal, the secondary gas generator 16 may generate gas which flows rapidly and under high pressure into the region of the bore 13 between the two pistons 14, 15. The pistons 14, 15 are thus driven outwardly in opposite directions moving with them the ends of the two catch elements 17, 18, thus pivotally moving the catch elements 17,18. The catch elements 17, 18 are moved to the respective positions shown in phantom in FIG. 2 in which the catch elements 17, 18 no longer extend across any part of the flange 9 of the main gas generator 6. The main gas generator 6 therefore becomes free to move to an open position, hinging about the hinges 10, thereby opening the aligned apertures 5, 2 in the support plate 4 and the air-bag 1 to allow gas generated by the main gas generator 6 to flow from the interior of the air-bag.

Figure 3:
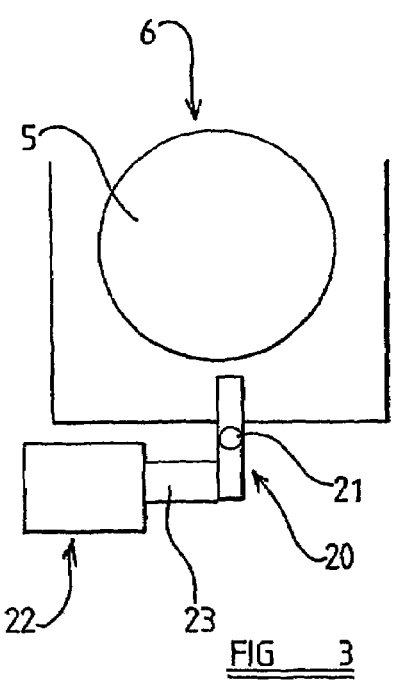
FIG. 3 is a view corresponding generally to FIG. 2 illustrating an alternative embodiment of the invention in an initial condition.
Figure 4:
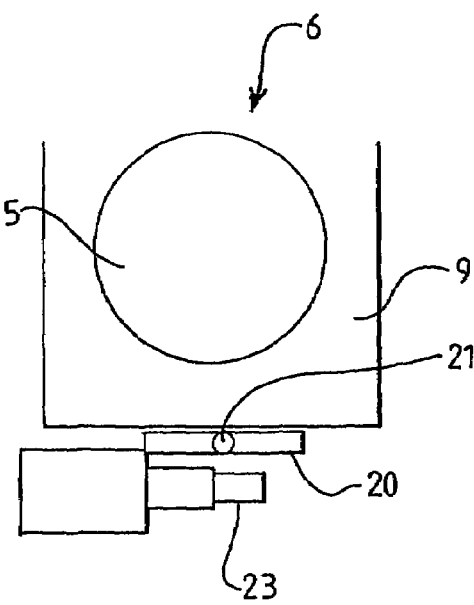
FIG. 4 is a view corresponding to FIG. 3 showing the embodiment of FIG. 3 in an alternate condition.

Whilst FIGS. 1 and 2 illustrate one mechanism for retaining the gas generator 6 in its initial closed position, alternative mechanisms may be used. FIGS. 3 and 4 illustrate an alternative arrangement. FIG. 3 illustrates the flange 9 of a gas generator 6 of the type described above. A rotatable catch element 20 is provided which is mounted for rotation about a substantially centrally located pivot pin 21 connected to the support plate 4. In an initial position illustrated in FIG. 3, a first part of the rotatable catch element 20 to one side of the pivot pin 21 is located in overlying engagement with the flange 9 to retain the gas generator 6 in its initial closed position.

A pyrotechnic unit 22 is provided which has an extending piston 23 which is arranged so as to engage or bear against a second part of the rotatable catch element 20. On actuation of the pyrotechnic unit 22, in response to an appropriate signal, the extending piston 23 is moved outwardly away from the pyrotechnic unit. As shown in FIG. 4, the arrangement is such that this movement of the piston 25 causes the catch element 20 to rotate about the pin 21 to a position in which the catch element 20 no longer overlies the flange 9 of the gas generator 6, thereby allowing the gas generator to move about the hinge 10.

Figure 5:
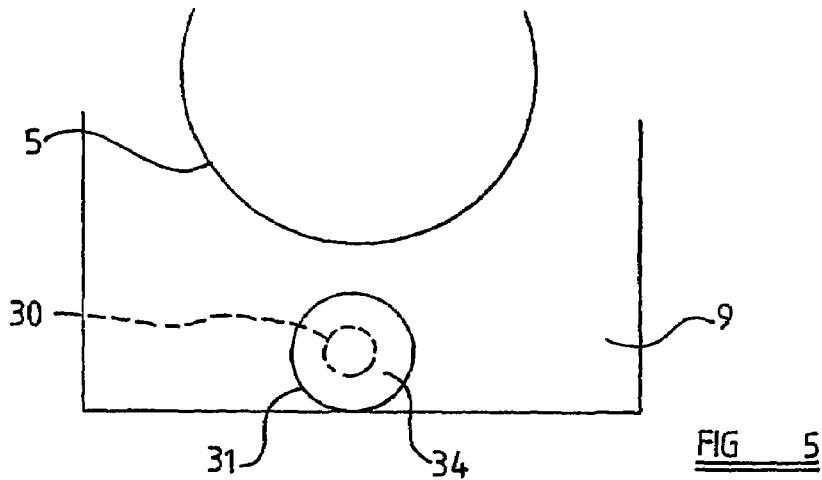
FIG. 5 is a view corresponding generally to FIG. 2 illustrating a further embodiment of the invention.
Figure 6:
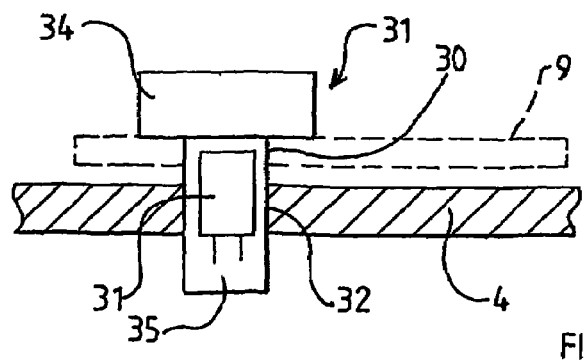
FIG. 6 is a sectional view of part of the embodiment of FIG. 5.

FIGS. 5 and 6 illustrate yet another embodiment of the invention in which the flange 9 of a gas generator 6 is secured to the support plate 4 by means of an explosive bolt. An aperture 30 is formed in the flange 9 and an explosive bolt 31 is provided which extends through the aperture 30 in the flange 9 to a corresponding aperture 32 in the support plate 4. Contained within the explosive bolt 31 is an explosive charge 33. On actuation of the explosive charge 33 in response to an appropriate signal, the head 34 of the bolt 31 is blown off to become detached from the shank 35 of the bolt 31, and thus the flange 9 of the gas generator 6 is no longer retained in its initial closed position, but instead is free to move about the hinges 10.

Whilst, in the embodiments of FIGS. 1 to 6, the gas generator 6 is initially retained in position and is then released so as to be allowed to move towards its open position under the influence of gas pressure within the air-bag 1, in the following embodiments the gas generator 6 is positively driven to an open position.

Figure 7:
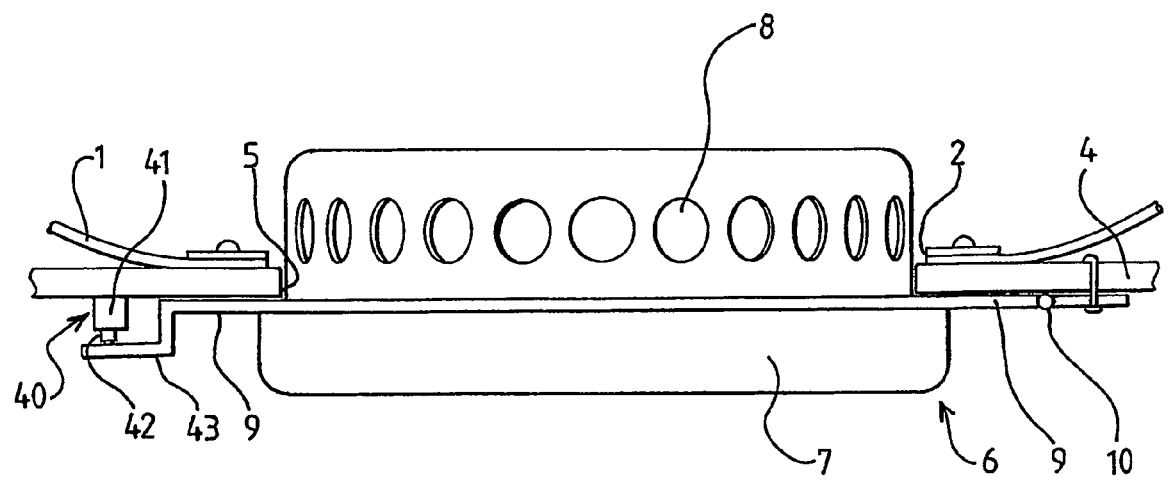
FIG. 7 is a view corresponding generally to FIG. 1 illustrating another embodiment of the invention in an initial condition.
Figure 8:
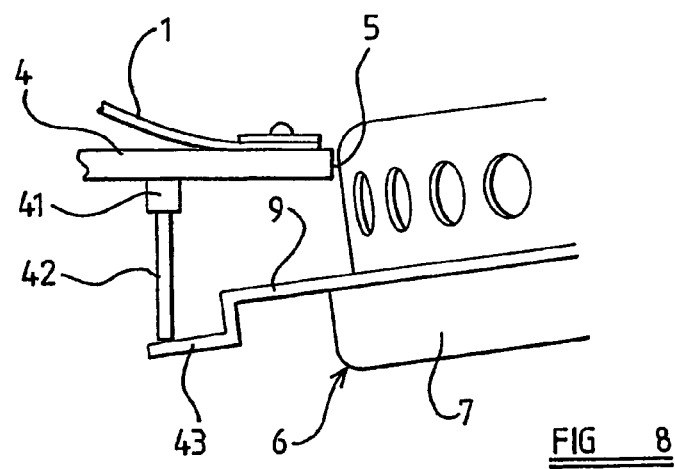
FIG. 8 is a view corresponding generally to FIG. 7 showing part of the embodiment of FIG. 7 in an alternate condition.

Referring now to FIG. 7, a retainer and opening mechanism 40 is provided which acts initially to retain the gas generator 6 in its initial closed position, and which is operable to drive the gas generator 6 to an open position. The retainer and drive mechanism 40 comprises a pyrotechnic unit 41 associated with an extending piston 42. The flange 9 of the gas generator is provided with an extension piece 43 which engages with the piston 42. Initially the retainer and opening mechanism 40 serves to hold the gas generator 6 in the initial closed position, but on firing of the pyrotechnic unit 41 in response to a firing signal, the piston 42 extends, as shown in FIG. 8, thus hingedly moving the gas generator 6 to an open position. The degree of extension of the piston 42 may be controlled in accordance with a control signal, and thus the degree of venting from the air-bag 1 provided by the described arrangement may be controlled.

Figure 9:
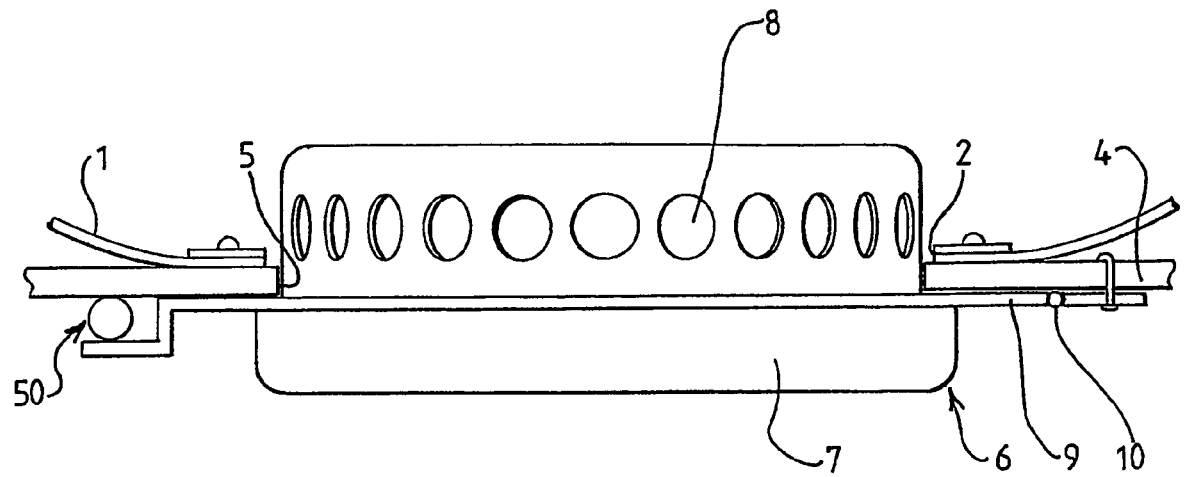
FIG. 9 is a view corresponding generally to FIG. 1 showing a still further embodiment of the invention.
Figure 10:
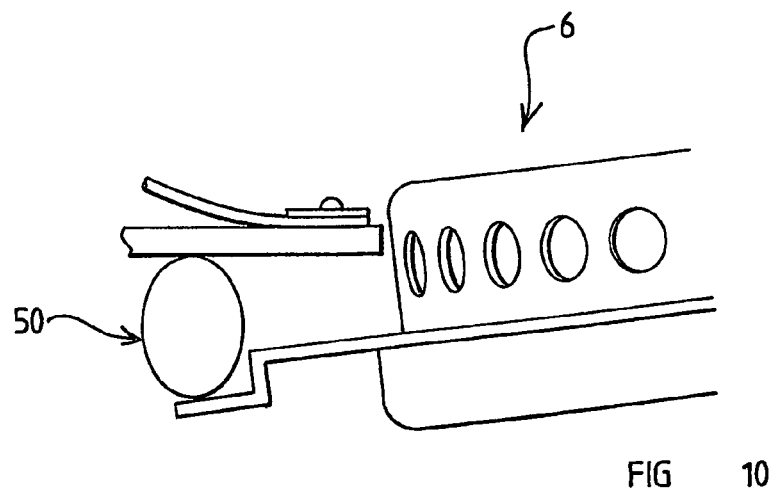
FIG. 10 is a view corresponding generally to FIG. 9 showing part of the embodiment of FIG. 9 in an alternate condition.

FIGS. 9 and 10 illustrate a further embodiment which is generally similar to that of FIGS. 7 and 8. However, instead of using a pyrotechnic arrangement with an extending piston, the embodiment shown in FIGS. 9 and 10 utilises an expandable element in the form of an expandable cylinder 50 as the retainer and opening arrangement. The expanding cylinder 50 has an initial predetermined diameter and is mounted in position in such a way that it retains the gas generator 6 in the desired initial closed position. The expanding cylinder 50 is associated with a secondary gas generator (not shown) configured to supply gas to the cylinder 50, the effect of which is to substantially increase the diameter of the cylinder 50. The cylinder 50 may thus be brought to a condition as shown in FIG. 10 in which the cylinder 50 has moved the gas generator 6 to an open condition.

FIGS. 11 and 12 illustrate a still further embodiment of the arrangement. In this arrangement, the flange 9 of the gas generator 6 is hingedly connected to the inside surface of the support plate 4 so that the gas generator 6 can move hingedly, in the manner of a door, from the closed position illustrated in which the gas generator extends across the apertures 5, 2 in an inward manner relative to the air-bag 1 to an open position. This is in contrast to the above-described embodiments in which the gas generator 6 is openable away from the air-bag 1.

The embodiment shown in FIGS. 11 and 12 utilises an expandable bellows arrangement 60 as the retainer and opening arrangement. The bellows arrangement 60 comprises an expandable and plastically deformable bladder 61 which has an initial configuration illustrated in FIG. 11 in which it is folded or compressed in such a way that it retains the gas generator 6 in the desired initial closed position. The expanding bladder 61 is associated with a pyrotechnic device 62 which is configured to be energised upon receipt of an appropriate signal so as to inflate, and hence expand the bladder 61. The bladder 61 deforms plastically as it expands from its initial condition illustrated in FIG. 11 to its expanded condition illustrated in FIG. 12. As will be clear from FIG. 12, as the bladder 61 expands, deforming plastically, it serves to move the gas generator 6 inwardly of the air-bag 1 to an open condition. Because the bladder 61 deforms plastically as it expands, it resists any tendency for the gas generator 6 to move back towards its closed position, for example under the action of the high pressure gas within the interior volume of the air-bag 1 upon actuation of the gas generator 6.

While the above description constitutes the preferred embodiment of the present invention, it will be appreciated that the invention is susceptible to modification, variation and change without departing from the proper scope and fair meaning to the accompanying claims.

The invention claimed is:

1. An air-bag arrangement comprising an air-bag, and a gas generator to generate a gas to inflate the air-bag, the gas generator being connected to a support so as to be moveable between a closed position in which part of the gas generator extends across an aperture communicating with the interior of the air bag to close the aperture, and an open position in which the aperture is opened to reduce the pressure of the gas within the air-bag, the gas generator initially being retained in the closed position by a retainer, the retainer being actuable, in response to a signal, to move the gas generator to the open position.

2. An air-bag arrangement according to claim 1 wherein the retainer is actuated by a pyrotechnic charge.

3. An arrangement according to claim 1 wherein the retainer comprises an expandable element which engages part of a flange carried by the gas generator, the expandable element, on expansion thereof, serving to move the gas generator to the open position.

4. An arrangement according to claim 3, wherein the expandable element is plastically deformable.

5. An arrangement according to claim 4, wherein the expandable element comprises a bellows arrangement provided with a pyrotechnic device.

6. An air-bag arrangement according to claim 1 wherein the gas generator moves between the open and closed position through movement about a hinge.

7. An arrangement according to claim 1 wherein the gas generator is urged to move to the open position by the retainer.

* * * * *

UNITED STATES PATENT AND TRADEMARK OFFICE
CERTIFICATE OF CORRECTION

| | |
|---|---|
| PATENT NO. | : 7,393,010 B2 |
| APPLICATION NO. | : 10/517409 |
| DATED | : July 1, 2008 |
| INVENTOR(S) | : Stefan Andersson |

It is certified that error appears in the above-identified patent and that said Letters Patent is hereby corrected as shown below:

On the Title Page, Item (73)

Under Assignee

Please correct "Autoliv Development AS" to read --Autoliv Development AB--.

Signed and Sealed this

Thirtieth Day of September, 2008

JON W. DUDAS
*Director of the United States Patent and Trademark Office*